Patented July 11, 1950

2,515,108

UNITED STATES PATENT OFFICE 2,515,108

PREPARATION OF GLYCOLS AND GLYCOL MONOESTERS

Seaver A. Ballard, Orinda, and Bradford P. Geyer and Robert H. Mortimer, Berkeley, Calif., assignors to Shell Development Company, San Francisco, Calif., a corporation of Delaware No Drawing. Application April 26, 1947, Serial No. 744,160

9 Claims. (Cl. 260—491)

This invention relates to a method of preparing monoesters of the 1,3-alkanediols, by a process which comprises the catalytic reduction of a beta-acyloxyalkanal corresponding to the desired 1,3-alkanediol monoester. It will be apparent that if the free 1,3-alkanediol is desired, the monoester provided by the process of the invention may be hydrolyzed in any suitable manner such as those that are well-known to the art to provide the free alkanediol by cleavage of the ester linkage.

The present invention is based upon the discovery that the aliphatic beta-acyloxyalkanals may be reduced by reaction with molecular hydrogen in the presence of a suitable hydrogenation catalyst to obtain the corresponding monoester of a 1,3-alkanediol in a highly efficacious manner and with desirable and advantageous results. In accordance with the invention, there preferably is employed as the hydrogenation catalyst a base metal hydrogenation catalyst such as a nickel hydrogenation catalyst, that has been treated, either before or after the stage in its preparation when it first acquires catalytic activity, so that it has in its active state a mildly basic to weakly acid, preferably a neutral to weakly acid, reaction. For the purposes of the present invention, the hydrogen ion reaction of the catalyst, that is, its acidity, or alkalinity, may be determined conveniently by dispersing a sufficient quantity of the catalyst in water maintained at ordinary temperatures, say 20° C. to 30° C., to form a dispersion containing approximately 2 per cent by weight of the catalyst, allowing sufficient time for equilibrium conditions to be established between the catalyst and the dispersing medium, and then determining the hydrogen ion concentration, or pH, of the dispersion in any known, suitable manner, as electrometrically. It will be apparent that other equivalent means of determining the hydrogen ion reaction of the catalyst may be employed. The present invention as described and as claimed herein is limited not in accordance with the use of the specific test just described but, rather, to the use of hydrogenation catalysts which have the herein described characteristics as may conveniently be determined in the foregoing or any equivalent manner.

It has been discovered in accordance with the present invention that the aliphatic beta-acyloxyalkanals may be reduced catalytically by reaction with hydrogen, by subjecting the beta-acyloxyalkanal to the action of hydrogen gas under a suitably elevated pressure and at an effective temperature, in the presence of a base metal hydrogenation catalyst, preferably a nickel hydrogenation catalyst that has been prepared and/or treated so that an approximately 2% dispersion of the catalyst in water has a pH of less than about 8.5, but preferably not below about 4.5, and most desirably within the range of from about 4.5 to about 7. It has been found that decomposition and other possible side reactions which normally could be expected and which would reduce the yield of the desired product, may be substantially minimized. It has been found further that the amount of fission of the beta-acyloxyalkanal into products containing fewer carbon atoms thereby may be retained within reasonable limits. According to the process of the invention, highly advantageous yields of and conversions to the desired product may be obtained in an economical and efficient manner.

One catalyst that is suited to the objects of the invention in certain cases is the well-known catalyst referred to in the art as Raney nickel catalyst, that may be prepared by treating an alloy of nickel and silicon and/or aluminum with a solution of caustic alkali to dissolve the silicon and aluminum and to leave the nickel in a finely divided, pyrophoric, catalytically active state. However, Raney nickel catalyst as ordinarily prepared may have an excessively alkaline reaction when its hydrogen ion reaction is determined in the above-described or an equivalent manner. It has been found that the process of the invention may be executed with particularly favorable and desirable results when there is employed a catalyst that may be prepared by treating a Raney nickel catalyst with an acid or an acid-reacting material, so as to impart thereto a mildly basic to a mildly acid reaction, preferably a neutral to mildly acid reaction, within the above limits when the hydrogen ion reaction of the catalyst is determined in the above-described manner. An effective and particularly convenient method of treating the catalyst to render it suitably mildly basic to mildly acidic in reaction comprises suspending the catalyst as initially prepared, in a suspending medium such as water, and adding an acid such as phosphoric acid, hydrochloric acid or acetic acid, or an acid reacting salt, to the dispersion in a quantity sufficient to impart to the dispersion a stable pH of the desired value. The exact amount of acid-reacting material required in any given case cannot be stated with exactitude since it will depend upon various factors such as the previous history of the catalyst, and the like. However, the necessary amount may be determined readily by measurement of the pH of the catalyst suspension, most conveniently during the addition of the acid or acid-reacting material, and by adding an amount of the acid reacting material sufficient to impart the desired pH value to the dispersion. The pH of the dispersion may be determined electrometrically, colorimetrically, or otherwise, in ways that are well-known to the art. Alternatively, the Raney nickel catalyst may be treated as by washing with a buffer solution such as a solution of acetic acid and sodium acetate or of other salts and/or acids having buffering powers within the desired range of pH, adjusted in known manner to the pH value it is desired to impart to the catalyst, in a quantity sufficient to impart to the catalyst the desired hydrogen ion reaction. It will be obvious, of course, that the presence during such treatment, of substances or ions poisonous to the hydrogenation catalyst is to be avoided. After treatment such as the foregoing, the catalyst may be washed with water or with an organic solvent such as alcohol to remove residual traces of the acid-reacting material, and then stored in the usual manner, such as in a moist condition or under a suitable liquid such as water, until it is to be used.

Although the process of the present invention may be executed most advantageously with the aid of a catalyst prepared from Raney nickel catalyst in the foregoing or an equivalent manner, other hydrogenation catalysts prepared in the foregoing or an equivalent manner from other nickel hydrogenation catalysts may be employed in the process. Nickel catalysts which have been prepared by methods comprising, for example, (a) decomposition, or reduction of a nickel salt, such as a formate, a carbonate, a bicarbonate, or the like, by heat, by treatment with hydrogen, or otherwise, (b) mechanical reduction of massive nickel to a more finely divided state, (c) precipitation of metallic nickel as by electrochemical means from solutions of nickel salts, thus also may be employed in the process of the present invention. Other base metal catalysts, such as cobalt, copper, etc., also may be utilized in the process of the invention. The catalysts that are employed in the present process may comprise, if desired, promotor substances, such as the difficultly reducible, oxygen-containing salts of metals of groups II, III, IV, V, or VI of the periodic table of the elements, or co-catalysts such as other base metals and the like.

The reduction, or hydrogenation, of the beta-acyloxyalkanal to the corresponding 3-acyloxyalkanol may be effected by treating the beta-acyloxyalkanal with hydrogen in the presence of the hydrogenation catalysts, under effective hydrogenation conditions of temperature of reaction, pressure of hydrogen, amount of catalyst, and the like. It has been found that optimum yields of the desired 1,3-alkanediol monoesters may be obtained most advantageously under relatively mild conditions of hydrogenation. The temperature during the treatment with hydrogen thus desirably is maintained at a relatively low value. Ordinary room temperatures frequently are suitable, temperatures between about 10° C. and about 100° C., preferably between about 10° C. and about 50° C., being more generally applicable. Either substantially higher or substantially lower temperatures may lead to a reduction in yield and/or conversion through undesirable effects upon the outcome of the process. The pressure of hydrogen desirably is not inordinately high. It desirably is maintained between about 250 and about 5000 pounds per square inch, the more limited range of from about 500 to about 1500 pounds per square inch being preferable. Higher pressures of hydrogen may be employed in certain cases, if desired, although the requirements that thereby may be imposed upon the apparatus render the lower pressures particularly convenient and advantageous.

The process of the present invention may be executed in either a batchwise, intermittent, or continuous manner. In the case of batchwise operations, an effective amount of the catalyst may be suspended or dispersed in the beta-acyloxyalkanal and the mixture subjected to the action of hydrogen gas under the aforesaid or equivalent conditions of temperature and pressure of hydrogen until the amount of hydrogen required by the reaction has been absorbed. The amount of catalyst to be employed depends upon its activity, and similar factors, and may be varied as desirable or necessary. With the hereindescribed neutral to mildly acid catalyst prepared from Raney nickel catalyst, amounts of catalyst corresponding to between about 5 and about 25 per cent by weight of the beta-acyloxyalkanal may be employed. Similar amounts of the other catalysts referred to herein also generally are effective, although greater or lesser amounts may be employed if desirable. As an example of reaction times suitable for completion of the reaction, in the case of batchwise operations, the hydrogenation of beta-acetoxypropionaldehyde to the monoacetate of 1,3-propanediol has been carried out satisfactorily in the presence of the catalyst prepared from Raney nickel catalyst, at temperatures between 15° C. and 35° C. and under a hydrogen pressure between 500 and 1000 pounds per square inch, in from 8 to 16 hours. The invention is not limited according to the time required or employed, however, and it will be apparent that longer or shorter times of reaction may be employed as the circumstances dictate or indicate.

The process also may be effected continuously in any suitable manner and in any suitable apparatus, for example, by passing a stream of the beta-acyloxyalkanal into contact with the catalyst, supported, if desired, on an inert or catalytically active supporting material such as kieselguhr or pumice, in the presence of hydrogen gas and under effective conditions of temperature, pressure of hydrogen, etc., such as those referred to previously herein.

If desired, an inert solvent such as an inert organic solvent may be included in the reaction mixture, as by dissolving the beta-acyloxyalkanal therein, suitable solvents for this purpose comprising alcohols, saturated or aromatic hydrocarbons, oxygen-containing heterocyclic solvents such as dioxane, and the like. Either the beta-acyloxy alkanal or the solvent may be present in excess, the amount of solvent desirably being limited, however, to an amount not in excess of approximately 5 times the weight of the beta-acyloxyalkanal.

Although in its broader aspects not limited thereto, the process of the present invention is particularly suited to the hydrogenation of the saturated aliphatic beta-acyloxy alkanals to obtain the corresponding saturated aliphatic 1,3-alkanediol monoesters. By the term "saturated aliphatic" acyloxyalkanal, it is intended to refer to a compound of the indicated class that has an acyclic structure and that contains only saturated carbon-to-carbon bonds. Among the saturated aliphatic beta-acyloxyalkanals which may be hydrogenated with particular advantage according to the present process, are for example, the lower aliphatic beta-acyloxyalkanals containing a total of up to ten carbon atoms. Beta-acetoxy propionaldehyde, beta-formoxypropionaldehyde, beta-acetoxybutyraldehyde, beta-propionoxyisobutyraldehyde, beta-acetoxyvaleraldehyde, beta-butyroxypropionaldehyde, beta-butyroxyvaleraldehyde, beta-acetoxy-alpha-ethylbutyraldehyde, and homologs and analogs thereof thus are among the compounds which most advantageously may be converted to the corresponding 1,3-alkanediol monoesters by means of the present process.

One particular field of utility of the present process resides in its use as an economically advantageous method of preparing 1,3-glycols, such as 1,3-propanediol, 1,3-butanediol, 2-methyl-1,3-propanediol, 2-ethyl-1,3-butanediol and homologs and analogs thereof. If the free glycols, rather than the monoesters thereof, are desired as the ultimate product, the monoesters provided by the present process can be converted, by methods well-known to those skilled in the art, to the respective glycols. In such a case, it is particularly convenient and economical to employ in the present process, the beta-acetoxyalkanals within the present class of beta-acyloxyalkanals, not only because of the lower cost of the acetoxy derivatives relative to other possible acyloxy derivatives but also because of otherwise favorable results obtainable therewith.

The following example will serve to illustrate one of the many possible specific embodiments of the present invention. It will be understood that the example is presented for the purpose of illustrating the invention, and not to unnecessarily limit the same as it is defined in the appended claims.

*Example*

Raney nickel catalyst, prepared in the customary manner by treating a nickel-aluminum alloy with a solution of caustic alkali and washing the residual nickel with water, was dispersed in 45 itmes its weight of water. Approximately 1 normal sulfuric acid was added carefully and with agitation to the catalyst dispersion, the pH of the dispersion being determined at intervals electrometrically by means of a glass electrode pH meter. The addition of the sulfuric acid was continued until an amount had been added sufficient to impart to the dispersion a pH of 6.6 as determined by means of the glass electrode. The catalyst dispersion then was filtered and the mildly acidic catalyst was washed with water until sulfate-free, and with a small amount finally of ethanol to remove residual traces of water.

Five parts of the moist catalyst thus obtained were suspended in a solution of 35 parts of beta-acetoxypropionaldehyde in 100 parts of 1,3-dioxane and the mixture was subjected to the action of an excess of hydrogen gas at a pressure of about 800 pounds per square inch and at a temperature of 18° C. to 35° C. The hydrogenation proceeded smoothly. After about 16 hours, the resultant mixture was filtered to remove the catalyst, the 1,3-dioxane was removed by distillation under reduced pressure, and the remaining material was subjected to fractional distillation. 3-acetoxypropanol (the monoacetate of 1,3-propanediol) was recovered in a yield in excess of 85 per cent, as the fraction distilling between 87° C. and 87.5° C. under a pressure of 8.5 millimeters of mercury.

We claim as our invention:

1. A method of preparing the monoacetate of 1,3-propanediol which comprises subjecting beta-acetoxypropionaldehyde to the action of hydrogen under a pressure between about 250 and about 1500 pounds per square inch at a temperature between about 10° C. and about 50° C. in the presence of a nickel hydrogenation catalyst prepared by treating Raney nickel catalyst with an acid-reactive electrolyte non-poisonous thereto in an amount sufficient to impart to the catalyst a pH in an approximately 2 per cent suspension in water, less than 7.0 but not below about 4.5.

2. A method of preparing the monoacetate of 2-methyl-1,3-propanediol which comprises subjecting beta-acetoxyisobutyraldehyde to the action of hydrogen under a pressure between about 250 and about 1500 pounds per square inch at a temperature between about 10° C. and about 50° C. in the presence of a nickel hydrogenation catalyst prepared by treating Raney nickel catalyst with an acid-reacting electrolyte non-poisonous thereto in an amount sufficient to impart to the catalyst a pH in an approximately 2 per cent suspension in water, less than 7.0 but not below about 4.5.

3. A method of preparing 3-acetoxy-1-butanol which comprises subjecting beta-acetoxybutyraldehyde to the action of hydrogen under a pressure between about 250 and about 1500 pounds per square inch at a temperature between about 10° C. and about 50° C. in the presence of a nickel hydrogenation catalyst prepared by treating Raney nickel catalyst with an acid-reacting electrolyte non-poisonous thereto in an amount sufficient to impart to the catalyst a pH in an approximately 2 per cent suspension in water, less than 7.0 but not below about 4.5.

4. A method of preparing a lower aliphatic monoester of a 1,3-alkanediol which comprises subjecting a lower aliphatic beta-acyloxyalkanal to the action of hydrogen under a pressure between about 250 and about 1500 pounds per square inch at a temperature between about 10° C. and about 50° C. in the presence of a nickel hydrogenation catalyst prepared by treating Raney nickel catalyst with an acid-reacting electrolyte non-poisonous thereto in an amount sufficient to impart to the catalyst a pH in an approximately 2 per cent suspension in water, less than 7.0 but not below about 4.5.

5. A method of preparing the monoacetate of 1,3-propanediol comprising reacting beta-acetoxypropionaldehyde with hydrogen in the presence of a hydrogenation catalyst prepared by treating Raney nickel catalyst with an acid-reacting electrolyte non-poisonous thereto in an amount sufficient to impart to the catalyst a pH in an approximately 2 per cent suspension in water, less than 7.0 but not below about 4.5.

6. A method of preparing a lower aliphatic mono-ester of a 1,3-alkanediol comprising reacting a lower aliphatic beta-acyloxyalkanal with hydrogen in the presence of a nickel hydrogenation catalyst prepared by treating Raney nickel catalyst with an acid-reacting electrolyte non-poisonous thereto in an amount sufficient to impart to the catalyst a pH in approximately 2 per cent suspension in water, less than 8.5 but not below about 4.5.

7. A method of preparing a lower aliphatic monoester of a 1,3-alkanediol comprising subjecting a lower aliphatic beta-acyloxyalkanal to the action of hydrogen under a pressure between about 250 and about 5000 pounds per square inch at a temperature between about 10° C. and about 100° C. in the presence of a base metal hydrogenation catalyst having a pH in an approximately 2 per cent suspension in water, less than 8.5 but not below about 4.5.

8. A method of preparing the mono-acetate of 1,3-propanediol comprising reacting beta-acetoxypropanal with hydrogen in the presence of a base metal hydrogenation catalyst having a pH in an approximately 2 per cent suspension in water, less than 8.5 but not below about 4.5.

9. A method of preparing a lower aliphatic monoester of a 1,3-alkanediol comprising reacting a lower aliphatic beta-acyloxy alkanal with hydrogen in the presence of a base metal hydrogenation catalyst having a pH in an approximately 2 per cent suspension in water, less than about 8.5 but not below about 4.5.

SEAVER A. BALLARD.
BRADFORD P. GEYER.
ROBERT H. MORTIMER.

REFERENCES CITED

The following references are of record in the file of this patent:

UNITED STATES PATENTS

| Number | Name | Date |
|---|---|---|
| 2,278,549 | Loder | Apr. 7, 1942 |

OTHER REFERENCES

Homer Adkins, Reactions of Hydrogen, fourth printing, 1946; publishers, Univ. of Wisc. Press, Madison, Wis., pp. 50, 51, 129.